(12) United States Patent
Gutknecht et al.

(10) Patent No.: US 12,719,309 B2
(45) Date of Patent: Aug. 25, 2026

(54) ENERGY SUPPLY UNIT, ENERGY SUPPLY SYSTEM HAVING AN ENERGY SUPPLY UNIT, AND A METHOD FOR OPERATING AN ENERGY SUPPLY UNIT

(71) Applicant: instagrid GmbH, Ludwigsburg (DE)

(72) Inventors: Philipp Gutknecht, Mönsheim (DE); Raphael Zürner, Ludwigsburg (DE)

(73) Assignee: instagrid GmbH, Ludwigsburg (DE)

( * ) Notice: Subject to any disclaimer, the term of this patent is extended or adjusted under 35 U.S.C. 154(b) by 291 days.

(21) Appl. No.: 18/559,678

(22) PCT Filed: Apr. 27, 2022

(86) PCT No.: PCT/EP2022/061199
§ 371 (c)(1),
(2) Date: Nov. 8, 2023

(87) PCT Pub. No.: WO2022/238122
PCT Pub. Date: Nov. 17, 2022

(65) Prior Publication Data

US 2024/0243608 A1 Jul. 18, 2024

(30) Foreign Application Priority Data

May 10, 2021 (DE) ..................... 10 2021 112 189.2

(51) Int. Cl.
*H02J 13/14* (2026.01)
*H02J 3/32* (2006.01)

(52) U.S. Cl.
CPC ................ *H02J 13/14* (2026.01); *H02J 3/32* (2013.01)

(58) Field of Classification Search
CPC ........ H02J 3/32; H02J 13/00004; H02J 9/005; H02J 2207/10
See application file for complete search history.

(56) References Cited

U.S. PATENT DOCUMENTS 8,904,203 B2 * 12/2014 Linne ................ H04L 12/40045 713/300
10,632,989 B2 * 4/2020 Ruybal ................ B60W 10/113
(Continued)

FOREIGN PATENT DOCUMENTS

| | | | |
|---|---|---|---|
| DE | 4117617 | A1 | 12/1991 |
| DE | 69023877 | T2 | 1/1996 |
| EP | 3334025 | A1 | 6/2018 |

OTHER PUBLICATIONS

Grag et al., Heterogeneous arrays of storage devices: An approach to get linear output with maximum efficiency from energy systems, 2014. IEEE, p. 1-4 (Year: 2014).*
(Continued)

*Primary Examiner* — McDieunel Marc
(74) *Attorney, Agent, or Firm* — The Webb Law Firm

(57) ABSTRACT

An energy supply unit includes a current supply connection, a consumer load connection, a primary power converter, which includes a converter for converting and transmitting energy from the current supply connection to the consumer load connection and which has an auxiliary circuit part, which has a primary-side energy supply, provided by a primary-side converter voltage fed to the converter, a secondary power converter connected to the current supply connection in parallel with the primary power converter; and a control unit electrically supplied with auxiliary energy and electrically connected in an information-transmitting manner to the auxiliary circuit part, the control unit causes, when the energy supply unit is in an energy transmission mode, an electrically effective connection of the converter to the current supply connection, and, when the energy supply unit is in a stand-by mode having reduced consumption, to interrupt the primary-side energy supply of the auxiliary circuit part.

16 Claims, 2 Drawing Sheets

(56) References Cited

U.S. PATENT DOCUMENTS

| | | | | |
|---|---|---|---|---|
| 11,390,154 | B2 * | 7/2022 | McBride | B60K 6/40 |
| 2007/0255969 | A1 * | 11/2007 | Theobald | H02J 13/00016 713/320 |
| 2012/0163054 | A1 * | 6/2012 | Luthi | H02J 9/005 363/126 |
| 2013/0031396 | A1 * | 1/2013 | Inukai | H02J 9/005 713/323 |
| 2017/0111977 | A1 * | 4/2017 | Lochmann | H05B 47/185 |
| 2020/0274350 | A1 * | 8/2020 | Allert | H02J 9/005 |
| 2022/0360094 | A1 * | 11/2022 | Berning | H01M 50/502 |

OTHER PUBLICATIONS

Paska et al., Technical and economic aspects of electricity storage systems co-operating with renewable energy sources, 2009, IEEE, p. 1-6 (Year: 2009).*

Wang et al., Studies of multi-type composite energy storage for the photovoltaic generation system in a micro-grid, 2011, IEEE, p. 791-796 (Year: 2011).*

Zhou et al., Coordinated Control Strategy for Photovoltaic/Battery Micro-grid, 2018, IEEE, p. 738-743 (Year: 2018).*

International Search Report for International Application No. PCT/EP2022/061199, dated Sep. 27, 2022, 2 pages.

Written Opinion for International Application No. PCT/EP2022/061199, dated Sep. 27, 2022, 3 pages.

* cited by examiner 15
15
16
20
17
19
24
10
25
18

30
4
1
1'
L
N
21
1
2
M-1
M
32
32
32
32
31

ENERGY SUPPLY UNIT, ENERGY SUPPLY SYSTEM HAVING AN ENERGY SUPPLY UNIT, AND A METHOD FOR OPERATING AN ENERGY SUPPLY UNIT

CROSS-REFERENCE TO RELATED APPLICATIONS

This application is a 35 U.S.C. § 371 National Stage patent application of PCT/EP2022/061199, filed on 27 Apr. 2022, which claims the benefit of German patent application 10 2021 112 189.2, filed on 10 May 2021, the disclosures of which are incorporated herein by reference in their entirety.

TECHNICAL FIELD

The disclosure relates to an energy supply unit for supplying a consumer load with electrical energy from an energy source, an energy supply system with a rechargeable energy storage unit, and to a method for operating an energy supply unit for supplying a consumer load with electrical energy from an energy source.

BACKGROUND

There are legal regulations limiting the admissible energy absorption of a grid-operated electric device, which may be connected to a household electricity grid, for instance, in the stand-by operation. Such a limit value may be 500 mW (and less), for instance.

Generally, energy supply units are well-known, which supply an electrical consumer load with electrical energy from an energy source, in particular an electricity grid (also referred to, in short, as a "grid" herein), wherein the electrical energy provided by the grid usually is available in the form of an alternating voltage and converted by the energy supply unit frequently by means of a power converter or converter, in particular adapted to the electrical requirements of the consumer load, and then transmitted to the consumer load. The output-side electrical output quantity converted by the converter may have a higher or lower voltage and/or current and/or frequency compared to the grid-side input quantity. Input and output quantities may both be either alternating voltages or direct voltages, or one of the two quantities may be an alternating voltage and the other a direct voltage.

For electrically supplying consumer loads consuming a high power, e.g. 100 W and more, the power converter may be designed accordingly. Generally, however, it is difficult or expensive to simultaneously dimension the power converter such that its power consumption drops below a certain limit, e.g. 10 W, in idling.

SUMMARY

Against this background, the disclosure is based on providing an energy supply unit for supplying a consumer load with electrical energy from an energy source, an energy supply system with a rechargeable energy storage unit, and a method for operating an energy supply unit, which are characterized, among other things, by a high degree of efficiency in the energy supply and a low stand-by energy absorption. Moreover, they are supposed to ensure a high electrical safety with low production costs.

This is accomplished by providing an energy supply unit with the features of claim 1, by an energy supply system having the features of claim 15, and by a method for operating an energy supply unit having the features of claim 16. Other particularly advantageous embodiments of the disclosure are disclosed by the respective dependent claims.

It must be noted that the features cited individually in the claims can be combined with each other in any technologically meaningful manner (also across the boundaries of categories, such as method and device) and represent other embodiments of the disclosure. The description, in particular in connection with the Figures, additionally characterizes and specifies the disclosure.

It may also be noted that a conjunction "and/or" used hereinafter, which is situated between two features and links them to each other, should always be interpreted such that, in a first embodiment of the subject matter according to the disclosure, only the first feature may be provided, in a second embodiment, only the second feature may be provided, and in a third embodiment, both the first and the second feature may be provided.

A term "about" used herein specifies a tolerance range which the person skilled in the art working in the present field considers to be common. In particular, the term "about" is to be considered to mean a tolerance range of the quantity concerned of up to a maximum of +/−20%, preferably up to a maximum of +/−10%.

Within the sense of the disclosure, moreover, relative terms used herein concerning a feature, such as "larger", "smaller", "higher", "lower", "heavier", "lighter" and the like are always to be interpreted such that deviations in size of the feature concerned, which are caused by production and/or realization and are within the production/realization tolerances defined for the production or realization of the respective feature, do not fall under the respective relative term. In other words, a size of a feature is to be considered as being, for instance, "larger", "smaller", "higher", "lower", "heavier", "lighter" and the like within the sense of the disclosure, than a size of a compared feature only if the two compared sizes differ so clearly in their amount that this difference in size certainly does not fall under the tolerance range of the feature concerned caused by the production/realization, but rather is the result of targeted action.

According to the disclosure, an energy supply unit for supplying a consumer load with electrical energy from an energy source, e.g. an electricity grid, such as, for example, but without a strict limitation thereto, a low-voltage grid (e.g. 230 VAC), comprises a current supply connection, a consumer load connection, a primary power converter, which comprises a converter and an auxiliary circuit part, at least one secondary power converter and a control unit.

The current supply connection serves for connecting the energy source on the electrically primary side to the energy supply unit. For this purpose, it may be configured as a plug-in device, for instance, with which the energy supply unit can be connected to the electricity grid if needed.

The consumer load connection makes it possible to electrically connect the consumer load on the consumer load-side with the energy supply unit. Here, it is to be understood that the consumer load connection does not have to be strictly realized by a detachable connection, but may also be configured as an electrical connection, which is operationally undetachable, permanent (e.g. soldered) between the consumer load and the energy supply unit. This may be particularly advantageous, for instance, in the case if the energy supply unit and the consumer load are components, in particular firmly incorporated components, of a higher-level system, e.g. of an energy supply system.

In this sense, it is also not strictly required to guide the consumer load connection outside from the energy supply unit at all. For instance, a consumer load, e.g. an energy storage unit such as a battery cell, may be integratedly incorporated in the energy supply unit, even in the converter itself, for instance. In this case the consumer load connection may also be an internal connection within the energy supply unit.

The converter (also referred to as a converting device) of the primary power converter serves for converting and transmitting the energy from the current supply connection to the consumer load connection. In general, this is to be understood to be a device that carries out an adaptation or conversion of the converter voltage fed on the primary side into a consumer load-side consumer-load voltage in order to adapt, among other things, the primary-side converter voltage to the electrical requirements of the consumer load. Accordingly, the consumer load-side output voltage of the converter may have, in particular, a higher or lower voltage and/or frequency compared to the grid-side input voltage or primary-side converter voltage. Input and output quantities may both be alternating voltages or direct voltages, or one of the two quantities may be an alternating voltage and the other a direct voltage. Also, input and output quantities may be related to a current instead of a voltage.

The auxiliary circuit part of the primary power converter is provided in order to detect at least one operating parameter of the primary power converter and/or operationally control the converter. Operating parameters may be, for instance, a voltage, a current, a temperature and the like, which can be detected by the auxiliary circuit part in order to monitor a momentary operating state of the primary power converter or the converter and, if necessary during the detection of a critical operating state (e.g. over-/undervoltage/-current/-temperature), to take countermeasures, independently or caused by the control unit, i.e. to carry out the abovementioned control, such as, for instance, temporarily disconnecting the converter in an electrically efficient manner from the current supply connection or to temporarily limit a transmission power and the like, in order to prevent undesired effects in short-term overvoltages. Accordingly, the auxiliary circuit part differs from the converter in that it is substantially not involved in the actual energy conversion.

In order to fulfil its task, the auxiliary circuit part itself requires electrical energy. Accordingly, the auxiliary circuit part has a primary-side energy supply, which is provided by the primary-side converter voltage fed to the converter. A typical power consumption of the auxiliary circuit part may in this case be about 1.5 mA at 12 V, for instance.

The at least one secondary power converter serves for providing auxiliary energy on the secondary side, and is connected, on the primary side, to the current supply connection in parallel with the primary power converter.

The auxiliary energy provided by the secondary power converter is used to supply the control unit arranged on the secondary side with electrical energy. For this purpose, it may be provided that the secondary power converter, in contrast to the primary power converter, provides only a small maximum power, e.g. 3 W, which in any case does not suffice to maintain a proper operation of the consumer load connected to the consumer load connection. Advantageously, the primary power converter may in contrast be configured such that the power requirement for the proper operation of the consumer load, e.g. preferably at least 100 W, 300 W or at least 500 W, can be covered by it.

Moreover, the control unit is electrically connected in an information-transmitting manner to the auxiliary circuit part by means of an information path in order to control the primary power converter in a manner dependent upon the transmitted information, wherein the control may take place directly (e.g. via a corresponding control path/control line) or indirectly (e.g. via the auxiliary circuit part).

The information transmission may include, for instance, the operating parameters detected by the auxiliary circuit part (e.g. the voltage, current, temperature, etc.). The information transmission may also include control information which may, in particular, be transmitted by the control unit to the auxiliary circuit part in order to cause the control of the primary power converter. Thus, the information transmission may take place via the information path in a bi-directional manner between the auxiliary circuit part and the control unit, without, however, being strictly limited to a bi-directional information transmission via the information path.

According to the disclosure, the control unit is configured to cause, when the energy supply unit is in an energy transmission mode, an electrically effective connection of the converter to the current supply connection and provide the auxiliary circuit part with the primary-side energy supply, and, when the energy supply unit is in a stand-by mode having reduced consumption in comparison with the energy transmission mode, to cause an electrically effective disconnection of the converter from the current supply connection and interrupt the primary-side energy supply of the auxiliary circuit part.

The energy supply unit according to the disclosure, among other things, with the disconnection between the primary power converter for the energy transmission and the secondary power converter for the supply of auxiliary current to the control unit in combination with the controllable switch-off of the auxiliary circuit part, creates the possibility of significantly reducing the idle power consumption of the consumer load operated via the energy supply unit on the electricity grid in the stand-by mode. In particular legal requirements, e.g. the limit value of 500 mW maximum stand-by energy consumption mentioned in the introduction, can thus be safely fulfilled. Nevertheless, consumer loads with an operational power consumption, e.g. at least 100 W, preferably at least 300 W, and more preferably at least 500 W, which is large compared to such a threshold value, can be reliably and safely supplied via the energy supply unit. Since the primary power converter, apart from its actual power transmitting function, substantially does not also have to be specially designed for the low-consumption stand-by mode, it may have a lower number of components, which increases the efficiency factor of the power conversion and reduces the production costs.

The control unit is configured to cause in the stand-by mode the electrically effective disconnection of the converter from the current supply connection. This may take place, for instance, by means of the auxiliary circuit part (indirect control). Alternatively or additionally, the control unit may also directly cause, via a separately provided control path, the switching off or disconnection of the converter (direct control), e.g. by switching (i.e. opening/closing) a correspondingly provided switching means (e.g. a power semiconductor switch).

Alternatively or additionally, the auxiliary circuit part according to a possible embodiment of the subject matter of the disclosure can be configured for electrically effectively disconnecting the converter selectively from the current supply connection. This may take place, for instance, in response to a control information transmitted by the control unit via the information path.

The disconnection of the converter may temporarily take place also by the auxiliary circuit part, if the latter detects, for instance, an overvoltage at the current supply connection and/or in the primary power converter, in order to react immediately (i.e. in the shortest time) to such overvoltage events. Thus, negative effects on the converter can be avoided. The temporary disconnection of the converter, in the case of overvoltage vents, for instance, can also be caused by the control unit by the latter transmitting a control information via the information path to the auxiliary circuit part.

Additionally or alternatively, the auxiliary circuit part may also be configured, also automatically already by the above-described switching off of the auxiliary circuit part in the stand-by mode, to electrically effectively disconnect the converter from the current supply connection, so that the separate control path between the control unit and the converter may be dispensed with, if necessary.

The production costs of the energy supply unit and its power consumption in the stand-by mode can be further reduced by the secondary power converter being configured to consume, compared with the primary power converter, a lower idle power. In a technically simple and inexpensive manner, the secondary power converter can be designed for a substantially lower idle power, of preferably 500 mW at most, more preferably 300 Mw at most, and most preferably 100 mW at most, than the (preferably high-performance) primary power converter, whose limitation to a maximum power consumption during idling to less than 10 W already entails a considerable additional constructional effort, an increase of complexity and significant additional costs.

An advantageous development of the subject matter of the disclosure provides that the auxiliary circuit part also has a secondary-side energy supply provided by the auxiliary energy of the secondary power converter. In this way, a part of the auxiliary circuit part can be supplied via the primary-side energy supply, and another part of the auxiliary circuit part, in particular the part galvanically connected to the information path, can be supplied via the secondary-side energy supply, which also supplies the control unit connected to the information path. Thus, it is possible to provide a galvanic isolation between the control unit and the primary power converter, and nevertheless to provide the information-transmitting connection between the control unit arranged on the secondary side and the auxiliary circuit part of the primary power converter, by the auxiliary circuit part accordingly being configured in a correspondingly separated manner.

In another advantageous embodiment of the disclosure, a galvanic isolation (isolation) can be inserted by means of a corresponding isolation device between the control unit and the primary power converter or between the control unit and the grid input side of the primary power converter, i.e. the current supply connection. The galvanic isolation may take place, for instance, by means of an inductive or capacitive coupling device or by means of an optocoupler, without, however, being strictly limited thereto.

According to an advantageous development of the subject matter of the disclosure, the primary-side energy supply of the auxiliary circuit part takes place via a constant current source into which a controllable switching element is integrated. That means that the constant current source comprises the switching element as a component and is not connected downstream of the constant current source, in particular not connected in series therewith. Here, a switching element is to be understood to be a functional element that is operatively operated substantially only in two predetermined switching states, namely in an open, high-resistance switching state (open) and in a closed, low-resistance switching state (closed). Thus, the switching element is substantially not involved in the current control (control of the amperage) of the constant current source per se.

As was already mentioned herein, the primary-side power consumption of the auxiliary circuit part may be relatively low, e.g. only about 1.5 mA at 12 V, but it is in principle a challenge to provide the primary-side energy supply of the auxiliary circuit part via the primary-side converter voltage reliably and by means of an inexpensive structure. For example, even at the smallest admissible operating/grid voltage, e.g. 85 VAC, enough energy has to be provided for the auxiliary circuit part in order to be able to ensure a proper operation of the primary power converter. If, in addition, a current consumption of the primary-side energy supply is substantially linearly dependent on the operating/grid voltage, a quadratic relationship may approximately result between the power consumption and the operating/grid voltage, e.g. if an effective ohmic resistance is present in the primary-side energy supply. During the operation of the energy supply unit with higher operating voltages, e.g. 264 VAC, it may thus be more difficult to impossible to adhere to the requirements regarding the maximum stand-by power consumption.

In the present configuration, it is achieved by means of the constant current source that the relation between the power consumption of the primary-side energy supply and the operating voltage of the energy supply unit is linear in a first approximation. Nevertheless, values for the power consumption may result from only providing the constant current source that render the rest of the design of the energy supply unit more expensive. For example, 1.5 mA and 230 VAC operating voltages already result in 345 mW power consumption of the primary-side energy supply.

The combination provided in the present configuration of the constant current source with the controllable, integrated switching element offers the substantial advantage that the power consumption of the primary-side energy supply is substantially completely eliminated in the stand-by mode by the primary-side energy supply being completely interrupted, i.e. switched off.

In a preferred embodiment, the switching element may here be controlled by the control unit, because it can receive via the auxiliary circuit part the required information on the momentary operating state (i.e. the energy transmission or the stand-by) of the primary power converter, as is explained in detail herein.

Yet another advantageous embodiment of the disclosure provides that the switching element is an optocoupler with an optocoupler LED acting optically on an optocoupler transistor. Thus, a galvanic isolation between the primary-side energy supply and a unit controlling the switching element, which preferably may be the control unit arranged on the secondary side, for instance, can additionally be realized in a constructionally simple, technically elegant and inexpensive manner.

It is to be remarked that the primary-side energy supply with a constant current source and an integrated, controllable switching element, in particular a switching element that is controllable in a galvanically isolated manner, such as an optocoupler, for instance, basically is not strictly limited to a combination with the energy supply unit according to the disclosure disclosed herein. Rather, such an energy supply can be advantageously be used generally everywhere where a galvanic isolation between a control unit controlling the switching element and a supply voltage providing the energy supply (e.g. the primary-side converter voltage) is to be maintained, wherein the energy supply, if not used (e.g.

stand-by), can be switched off by means of the switching element and its idle power consumption can be reduced to substantially zero.

Accordingly, the scope of the present description is also to include, solely, such an energy supply that can be switched in a galvanically isolated manner. With regard to the definitions of the terms, features and their effects and advantages, which can also be ascribed in a technically meaningful manner to the energy supply that can be switched in a galvanically isolated manner, reference may made in full to the disclosure of corresponding definitions, features, effects and advantages of the energy supply unit according to the disclosure. Consequently, the disclosure herein regarding the energy supply unit according to the disclosure can be used, mutatis mutandis, also for defining the energy supply unit switched in a galvanically isolated manner, and vice versa. An explicit repetition of explanations of features that are basically the same, their effects and advantages may be omitted at this place for the sake of a more compact description, without such omissions having to be interpreted as limitations for, solely, the energy supply that can be switched in a galvanically isolated manner.

Another advantageous embodiment of the subject matter of the disclosure provides that the constant current source has a field-effect transistor, in particular a depletion type metal-oxide-semiconductor field-effect transistor, and a resistor connected in series therewith. By means of a suitable dimensioning of the resistor, in combination with the series-connected switching element, in particular if choosing an optocoupler as a switching element, the regular behavior of the constant current source can be optimally predetermined in the sense of a sufficiently high and reliable primary-side energy supply with a minimum own power consumption.

Also according to a preferred embodiment of the disclosure, a rectifier electrically connected to the current supply connection can be provided, which provides the primary-side converter voltage. For instance, the rectifier may be a diode rectifier. The rectifier may preferably be a component of the primary power converter, without, however, being strictly limited thereto. In any case, the primary-side energy supply is fed in the present case from the converter direct voltage provided by the rectifier.

According to further advantageous embodiments of the subject matter of the disclosure, the auxiliary circuit part can be configured to detect as operating parameters the primary-side converter voltage and/or a voltage of the primary-side energy supply and/or to detect as operating parameters a current flow to the converter and/or to the auxiliary circuit part.

Also preferably, the primary power converter can be configured and formed to provide at the consumer load connection an electric power of at least 100 W, more preferably at least 300 W and even more preferably at least 500 W.

According to yet another advantageous embodiment of the subject matter of the disclosure, at least one rechargeable energy storage unit electrically connected to the converter, e.g. a battery cell such as a lithium-ion cell, is provided. Here, the energy storage unit can be connected to the consumer load connection. In other words, the energy storage unit is in this case advantageously directly integrated (installed) into the energy supply unit. For instance, the at least one energy storage unit can be integrated into the converter. For this purpose, the converter may have, for instance, a so-called cascaded H-bridge circuit, into which the energy storage unit or units are correspondingly installed in an integrated manner and can be supplied for a charging process by the converter with the electrical energy supplied at the current supply connection.

According to another aspect of the disclosure, an energy supply system, in particular a mobile or portable energy supply system, has at least one rechargeable energy storage unit (e.g. a battery cell, such as a lithium-ion cell) and an energy supply unit according to one of the embodiments disclosed herein. The energy storage unit, in order to charge it, can be supplied via the energy supply unit with electric energy from an energy source, e.g. an electricity grid, that can be connected to the energy supply unit.

A mobile, in particular, however, a portable energy supply system is to be understood to be a system with a weight and size that can be handled by a single person. Accordingly, the weight of the energy supply system is preferably below 25 kilograms, and the size is dimensioned such that the energy supply system can be carried as a backpack, for instance. The energy supply system, however, is not strictly limited to a mobile or portable configuration.

According to yet another aspect of the disclosure, a method for operating an energy supply unit, preferably according to one of the embodiments disclosed herein, has the steps:

- providing a current supply connection with which an electrical energy source, in particular an electricity grid, is electrically connected,
- providing a consumer load connection with which a consumer load supplied electrically from the energy source is electrically connected,
- providing a primary power converter with a converter with which the energy from the current supply connection to the consumer load connection is converted and transmitted, and with an auxiliary circuit part, with which at least one operating parameter of the primary power converter is detected and/or the converter is controlled, wherein the auxiliary circuit part is provided with a primary-side energy supply from a primary-side converter voltage fed to the converter,
- providing at least one secondary power converter, which is connected to the current supply connection in parallel with the primary power converter, with which an auxiliary energy is provided on the secondary side,
- providing a control unit, which is electrically supplied with the auxiliary energy provided by the secondary power converter, wherein the primary power converter is controlled by the control unit in a manner dependent upon the information transmitted between the control unit and the auxiliary circuit part via an information path, wherein, when the energy supply unit is in an energy transmission mode, the converter is electrically effectively connected to the current supply connection and the auxiliary circuit part is provided with the primary-side energy supply, and, when the energy supply unit is in a stand-by mode having reduced consumption in comparison with the energy transmission mode, the converter is electrically effectively disconnected from the current supply connection and the primary-side energy supply of the auxiliary circuit part is interrupted.

It is remarked that, with regard to method-related definitions of terms, effects and advantages of features of the method and with regard to the energy supply system according to the disclosure also disclosed herein, reference may made in full to the disclosure of corresponding definitions, features, effects and advantages of the energy supply unit according to the disclosure. Accordingly, disclosures regarding the energy supply unit according to the disclosure may also be used, mutatis mutandis, for defining the method according to the disclosure and the energy supply system according to the disclosure, and vice versa, unless expressly excluded herein. A repetition of explanations of features that are basically the same, their effects and advantages may be omitted herein for the sake of a more compact description, without such omissions having to be interpreted as limitations.

BRIEF DESCRIPTION OF THE DRAWINGS

Other features and advantages of the disclosure become apparent from the following description of exemplary embodiments of the disclosure, which shall be understood not to be limiting and which will be explained below with reference to the drawing. In this drawing, the Figures schematically show.

DETAILED DESCRIPTION OF THE DRAWINGS

Figure 1:
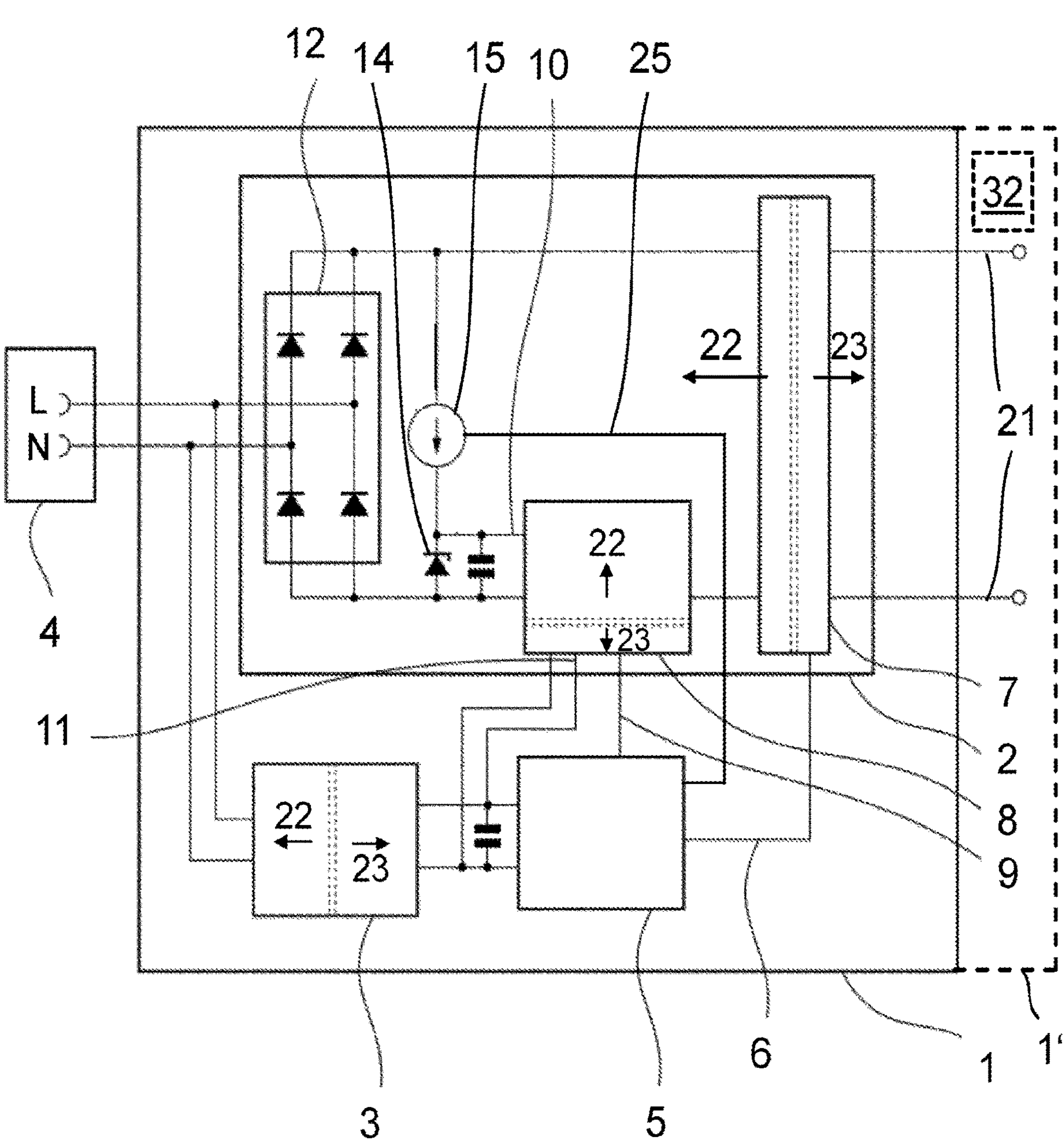
FIG. 1 a block circuit diagram of an exemplary embodiment of an energy supply unit according to the disclosure, FIG. 2 a circuit diagram of an exemplary embodiment of a primary-side energy supply of the energy supply unit from FIG. 1.

In the various figures, parts that are equivalent with respect to their function are always provided with the same reference numerals, so that they are also only described once, as a rule.

FIG. 1 shows a block circuit diagram of an exemplary embodiment of an energy supply unit 1 according to the disclosure for supplying a consumer load (not shown) with electrical energy from an energy source, e.g. an electricity grid such as a low-voltage alternating voltage grid with, for instance, 230 VAC.

In FIG. 1, the reference number 22 in each case denotes a primary side of the depicted functional components, and the reference number 23 in each case denotes a secondary side of these functional components.

It is apparent from FIG. 1 that the energy supply unit 1 has a current supply connection 4 for electrically connecting the energy supply unit 1 to the energy source. Moreover, the exemplary energy supply unit 1 has a consumer load connection 21 for electrically connecting the consumer load (e.g. the consumer load 32 in FIG. 3) to be supplied, as well as a primary power converter 2, which in turn comprises a converter 7 for converting and transmitting the energy from the current supply connection 4 to the consumer load connection 21 and which comprises an auxiliary circuit part 8 for detecting at least one operating parameter of the primary power converter 2 and/or for controlling the converter 7. The auxiliary circuit part 8 has a primary-side energy supply 10, which is symbolically illustrated in FIG. 1 at a primary-side energy supply connection of the auxiliary circuit part 8 and which is provided by a primary-side converter voltage fed to the converter 7.

In the depicted exemplary case of FIG. 1, without a strict limitation thereto, however, the primary-side converter voltage is a direct voltage provided by a diode rectifier 12, which the rectifier 12 generates from the grid voltage present at the current supply connection, which may be an alternating voltage (e.g. 230 VAC) provided via a phase conductor L and a neutral conductor N, for instance.

In the present case, the primary-side energy supply 10 is on the DC side of the rectifier 12.

It is further apparent from FIG. 1 that the supply voltage, which is fed to the auxiliary circuit part 8 and obtained from the primary-side energy supply, is applied by means of a conventional Z diode 14 to the respective supply connections of the auxiliary circuit part 8.

Moreover, the energy supply unit 1 in FIG. 1 has at least one secondary power converter 3 connected to the current supply connection 4 in parallel with the primary power converter 2, for providing auxiliary energy on the secondary side 23. This auxiliary energy is used in order to electrically supply a control unit 5 arranged on the secondary side 23 of the secondary power converter 3. The control unit 5 is electrically connected in an information-transmitting manner to the auxiliary circuit part 8 by means of an information path 9 (e.g. signal line(s), data bus, etc.). Thus, it is able to control the primary power converter 2 in a manner dependent on the information transmitted on the information path 9. Here, the control may take place directly (e.g. via a corresponding control line, such as a control path 6) or indirectly (e.g. via the auxiliary circuit part 8).

The control unit 5 of the energy supply system 1 shown in FIG. 1 is now configured to cause, when the energy supply unit 1 is in an energy transmission mode, an electrically effective connection of the converter 7 to the current supply connection 4 and, when the energy supply unit 1 is in a stand-by mode having reduced consumption in comparison with the energy transmission mode, to interrupt the primary-side energy supply 10 of the auxiliary circuit part 8, in particular to substantially switch it to be without current, so that a power consumption of the primary-side energy supply 10 in this case is substantially reduced to zero. The control unit 5 can cause the control of the primary-side energy supply 10 via a control path 25, for instance.

It is to be understood that the control unit 5 advantageously can also be configured to cause in the stand-by mode an electrically effective disconnection of the converter 7 from the current supply connection 4, in order to further significantly reduce the idle power consumption at the current supply connection 4. For this purpose, the control unit 5 may use a separate control path 6 (e.g. a control line) shown as an example in FIG. 1, which is preferably directly connected to the converter 7. However, the control unit 5 can also control the converter 7 by means of the auxiliary circuit part 8, that is, without a separate control path 6, i.e. electrically effectively disconnect it from the current supply connection 4, as was already explained in detail in the general part of this description. There, other possibilities for controlling or disconnecting the converter 7 are described. For example, the auxiliary circuit part 8 can be configured for electrically effectively disconnecting the converter 7 selectively from the current supply connection 4.

In the present case, the secondary power converter 3 is configured for consuming, compared to the primary power converter 2, a significantly lower idle power, e.g. a maximum of about 500 mW, or preferably even less, e.g. less than about 100 mW. The disclosure is not strictly limited to these specific values, even if they are considered to be particularly preferred embodiments.

In contrast, the primary power converter 2 is configured to provide at the consumer load connection 21 an electric power of at least 100 W, preferably at least 300 W and even more preferably at least 500 W. Again, the disclosure is not strictly limited to these specific values, even if they are considered to be particularly preferred embodiments.

In the energy supply unit 1 shown, the auxiliary circuit part 8 can be configured to detect as operating parameters the primary-side converter voltage (i.e. on the DC side of the rectifier 12) and/or a voltage of the primary-side energy supply 10 and/or to detect as operating parameters a current flow to the converter 7 and/or to the auxiliary circuit part 8.

Moreover, it is apparent from FIG. 1 that the auxiliary circuit part 8, in addition to its primary-side energy supply 10, also has a secondary-side energy supply 11 provided by the auxiliary energy of the secondary power converter 3. Among other thigs, this offers the advantage that a reliable galvanic isolation (isolation) can be inserted between the control unit 5 and the primary power converter 2, but at least to the grid input side (i.e. to the current supply connection 4) of the primary power converter 2 (not shown explicitly in FIG. 1). The galvanic isolation may take place by means of a suitable isolation device, e.g. an optocoupler, an inductive coupling device and the like.

FIG. 1 further shows that the primary-side energy supply 10 of the auxiliary circuit part 8 takes place via a constant current source 15 into which a controllable switching element 18 (FIG. 2) is integrated. Preferably, the switching element 18 can be controlled by the control unit 5.

Figures 2, 3:
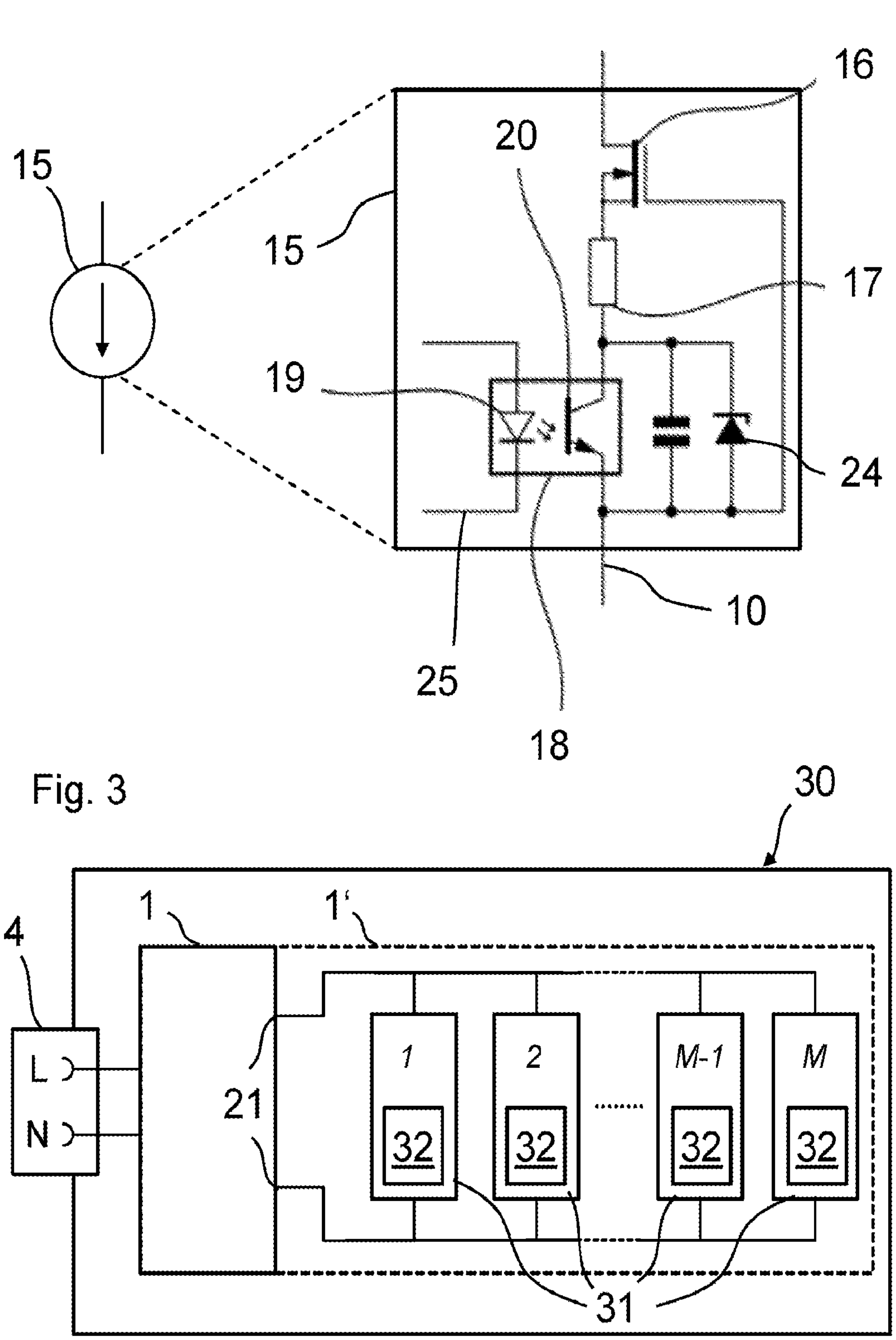
FIG. 3 shows a block circuit diagram of an exemplary embodiment of an energy supply system according to the disclosure.

FIG. 2 shows a circuit diagram of an exemplary embodiment of the primary-side energy supply 10 of the energy supply unit 1 from FIG. 1. The constant current source 15 substantially has a field-effect transistor 16, which in the present case is configured as a depletion type metal-oxide-semiconductor field-effect transistor, without, however, being strictly limited thereto. Moreover, the constant current source 15 has a resistor 17 connected in series with the field-effect transistor 16.

It is clear from FIG. 2 that the switching element 18 is an integrated component of the constant current source 15 itself and is not connected downstream of the constant current source 15 or connected in series therewith. That means that the constant current source 15 comprises the switching element 18 as an essential component. This can be clearly seen, among other things, at the gate connection of the field-effect transistor 16 which, starting from the FET 16, extends over the resistor 17 and the switching element 18 and is electrically connected to (the lower in FIG. 2) output of the energy supply 10.

The switching element 18 is operatively operated substantially only in two predetermined switching states, i.e. in an open, high-resistance switching state (open) and in a closed, low-resistance switching state (closed). In any case, the switching element 18 is substantially not involved in the current control (control of the amperage) of the constant current source 15 per se.

As is apparent from FIG. 2, the switching element 18 in the present case is an optocoupler, which is conventional per se, with an optocoupler LED 19 acting optically on an optocoupler transistor 20. Thus, FIG. 2 shows an exemplary structure of an energy supply that can be controlled in a galvanically isolated manner, in the present case the primary-side energy supply 10 of the auxiliary circuit part 8.

A Z diode 24 is also connected in parallel to the switching element 18 in the exemplary embodiment shown in FIG. 2.

If the current in the optocoupler LED 19 is suitably dimensioned, about 150 mV, for instance, drop across the collector-emitter section of the optocoupler transistor 20 in the switched-on state. This value is small compared to the voltage dropping over the resistor 17, which may be about 1 V to about 2.5 V—depending on the type of the field-effect transistor 16 used—and at the same time is independent of the flowing current. Therefore, if the optocoupler 18 is controlled, the conventionally known current regulating behavior of a constant current source occurs.

However, if the LED 19 of the optocoupler 18 is not controlled, the collector-emitter section of the optocoupler transistor 20 is not conductive, and a voltage in the range from about 1 to 5 V, in particular about 2 to 5 V, may drop over this section, which results in the field-effect transistor 16 blocking completely and the constant current source 15 being switched off in fact.

Advantageously, the Z diode 24 connected in parallel with the optocoupler 18 is capable, e.g. in the case of a fault, e.g. no resistance value of the resistor 17 or one that is too low, of limiting the voltage across the optocoupler (and consequently also the gate-source voltage of the field-effect transistor).

FIG. 3 shows a block circuit diagram of an exemplary embodiment of an energy supply system 30 according to the disclosure. It can be seen that the exemplary energy supply system 30 has at least one rechargeable energy storage unit 32 and an energy supply unit 1 according to one of the embodiments disclosed herein.

The energy supply system 30 shown in FIG. 3 has, for instance, a number M of battery modules 31, which in turn each have at least one energy storage unit 32, which may be formed of one or several battery cells, e.g. lithium-ion cells.

In order to charge the energy storage unit 32, they can be supplied via the energy supply unit 1 with electric energy from an energy source, e.g. an electricity grid, that can be connected to the energy supply unit 1. For this purpose, the energy source is electrically connected to the current supply connection 4 of the energy supply unit 1.

It is to be understood that the battery modules 31 and the energy supply unit 1 may be integrally electrically connected to one another. That means that the consumer load connection 21 does not have to be configured as an operationally detachable plug connection, such as the current supply connection 4, for instance.

It is also conceivable that the consumer load connection 21 is not explicitly guided out of the energy supply unit 1, as is to be indicated in FIG. 3 by the expansion of the energy supply unit 1' marked in a dashed manner. In such an embodiment, the battery cells 32 or the battery modules 31 may be integrated into the energy supply unit 1' or in the converter 7 of the energy supply unit 1'. For this purpose, the converter 7 may have, for instance, a so-called cascaded H-bridge circuit, into which the battery cells 32 are installed in an integrated manner and can be supplied by the converter or the H-bridge circuit (i.e. for a charging process).

FIG. 1 shows the expanded energy supply unit 1' in a schematically also independent way from the energy supply system 30 shown in FIG. 3, wherein the arrangement of the energy storage unit 32 in FIG. 1 is to be understood in only a symbolic manner. Rather, the energy storage unit 32, as was already mentioned above, may be connected in the energy supply unit 1' with the internal consumer load connection 21. For instance, the at least one energy storage unit 32 can be integrated into the converter 7. The converter 7 may have, for instance, a so-called cascaded H-bridge circuit (not shown), into which the energy storage unit or units 32 can be correspondingly installed in an integrated manner and can be supplied for a charging process by the converter 7 with the electrical energy supplied at the current supply connection 4.

After charging the energy storage units 32, the energy supply system 30 in FIG. 3 may serve, in particular, for operationally supplying an electric consumer load (not shown) that can also be connected to the current supply connection 4 with energy from the battery modules 31 or the energy storage units 32. Particularly preferably, the energy supply system 30 can be configured as a mobile or portable supply system, without, however, being strictly limited thereto. The energy supply system 30 may also be a stationary supply system.

Particularly preferably, the energy/current supply provided by the energy supply system 30 by means of the battery modules 31 may be dimensioned such that high-performance working machines, i.e. with an electrical power consumption above 1 kW, such as a diamond drill, high-pressure cleaners, industrial vacuum cleaners, for instance, can be operated.

The energy supply unit according to the disclosure disclosed herein and the method for operating an energy supply unit according to the disclosure disclosed herein are not limited to the embodiments respectively described herein, but also include embodiments having the same effects, which result from technically viable other combinations of the features of the energy supply unit and the method described herein. In particular, the features and combinations of features mentioned above in the general description and the description of the Figures and/or shown in the Figures alone can be used not only in the combinations explicitly specified herein, but also in other combinations or on their own, without departing from the scope of the present disclosure.

The invention claimed is:

1. An energy supply unit for supplying a consumer load with electrical energy from an energy source, the energy supply unit comprising:

a current supply connection for electrically connecting the energy source, a consumer load connection electrically connecting the consumer load to be supplied, a primary power converter, which comprises a converter for converting and transmitting the energy from the current supply connection to the consumer load connection and which comprises an auxiliary circuit part for detecting at least one operating parameter of the primary power converter and/or for controlling the converter, wherein the auxiliary circuit part has a primary-side energy supply, which is provided by a primary-side converter voltage fed to the converter, at least one secondary power converter connected to the current supply connection in parallel with the primary power converter, for providing auxiliary energy on the secondary side, and a control unit, which is electrically supplied with the auxiliary energy provided by the secondary power converter and which is electrically connected in an information-transmitting manner to the auxiliary circuit part by means of an information path in order to control the primary power converter in a manner dependent upon the transmitted information, wherein the control unit is configured to cause, when the energy supply unit is in an energy transmission mode, an electrically effective connection of the converter to the current supply connection and provide the auxiliary circuit part with the primary-side energy supply, and, when the energy supply unit is in a stand-by mode having reduced consumption in comparison with the energy transmission mode, to cause an electrically effective disconnection of the converter from the current supply connection and interrupt the primary-side energy supply of the auxiliary circuit part.

2. The energy supply unit according to claim 1, wherein the secondary power converter is configured to consume, compared with the primary power converter, a lower idle power.

3. The energy supply unit according to claim 1, wherein the auxiliary circuit part is configured for electrically effectively disconnecting the converter selectively from the current supply connection.

4. The energy supply unit according to claim 1, wherein the auxiliary circuit part has a secondary-side energy supply provided by the auxiliary energy of the secondary power converter.

5. The energy supply unit according to claim 1, wherein the primary-side energy supply of the auxiliary circuit part takes place via a constant current source into which a controllable switching element is integrated.

6. The energy supply unit according to claim 5, wherein the switching element is an optocoupler with an optocoupler LED acting optically on an optocoupler transistor.

7. The energy supply unit according to claim 6, wherein the constant current source has a field-effect transistor, and a resistor connected in series therewith.

8. The energy supply unit according to claim 6, wherein the switching element is controlled by the control unit.

9. The energy supply unit according to claim 1, wherein a rectifier electrically connected to the current supply connection is provided, which provides the primary-side converter voltage.

10. The energy supply unit according to claim 1, wherein the control unit is galvanically isolated from the primary power converter or from the current supply connection via a corresponding isolation device.

11. The energy supply unit according to claim 1, wherein the auxiliary circuit part is configured to detect as operating parameters the primary-side converter voltage and/or a voltage of the primary-side energy supply and/or to detect as operating parameters a current flow to the converter and/or to the auxiliary circuit part.

12. The energy supply unit according to claim 1, wherein the secondary power converter consumes a maximum idle power of at most 500 mW.

13. The energy supply unit according to claim 1, wherein the primary power converter is configured to provide at the consumer load connection an electric power of at least 100 W.

14. The energy supply unit according to claim 1, wherein at least one rechargeable energy storage unit is electrically connected to the converter.

15. An energy supply system, comprising at least one rechargeable energy storage unit and an energy supply unit according to claim 1, wherein the energy storage unit, in order to charge it, can be supplied via the energy supply unit with electric power from an energy source, that can be connected to the energy supply unit.

16. A method for operating an energy supply unit, the method including the following steps:

providing a current supply connection with which an electrical energy source, is electrically connected, providing a consumer load connection with which a consumer load supplied electrically from the energy source is electrically connected, providing a primary power converter with a converter with which the energy from the current supply connection to the consumer load connection is converted and transmitted, and with an auxiliary circuit part, with which at least one operating parameter of the primary power converter is detected and/or the converter is controlled, wherein the auxiliary circuit part is provided with a primary-side energy supply from a primary-side converter voltage fed to the converter, providing at least one secondary power converter, which is connected to the current supply connection in parallel with the primary power converter, with which an auxiliary energy is provided on the secondary side, and providing a control unit, which is electrically supplied with the auxiliary energy provided by the secondary power converter, wherein the primary power converter is controlled by the control unit in a manner dependent upon the information transmitted between the control unit and the auxiliary circuit part via an information path, wherein, when the energy supply unit is in an energy transmission mode, the converter is electrically effectively connected to the current supply connection and the auxiliary circuit part is provided with the primary-side energy supply, and, when the energy supply unit is in a stand-by mode having reduced consumption in comparison with the energy transmission mode, the converter is electrically effectively disconnected from the current supply connection and the primary-side energy supply of the auxiliary circuit part is interrupted.

* * * * *